United States Patent
Böhm et al.

(10) Patent No.: US 7,377,160 B2
(45) Date of Patent: May 27, 2008

(54) SENSOR ARRANGEMENT FOR A TACHOMETER ON AN AUTOMATIC TRANSMISSION OF A MOTOR VEHICLE

(75) Inventors: Ralph Böhm, Bodman-Ludwigshafen (DE); Gerhard Birkenmaier, Tettnang-Walchesreute (DE); Jörg Kurth, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 55 days.

(21) Appl. No.: 11/430,573

(22) Filed: May 9, 2006

(65) Prior Publication Data

US 2006/0254351 A1   Nov. 16, 2006

(30) Foreign Application Priority Data

May 11, 2005  (DE)  .................. 10 2005 021 717

(51) Int. Cl.
*G01F 15/08* (2006.01)
(52) U.S. Cl. ................... 73/200; 73/494; 73/866.2; 324/160; 324/174
(58) Field of Classification Search ............. 73/200, 73/494, 866.5; 324/174
See application file for complete search history.

(56) References Cited

U.S. PATENT DOCUMENTS

| | | | | |
|---|---|---|---|---|
| 4,316,144 A | * | 2/1982 | Levijoki | .............. 324/174 |
| 4,511,840 A | | 4/1985 | Leach, Jr. | |
| 5,018,384 A | | 5/1991 | Hayashi et al. | |
| 5,325,734 A | | 7/1994 | Jordan | |
| 6,158,609 A | | 12/2000 | Kaiser | |
| 6,392,406 B1 | * | 5/2002 | Palfenier et al. | ............ 324/174 |

FOREIGN PATENT DOCUMENTS

| | | |
|---|---|---|
| DE | 40 33 860 A1 | 4/1992 |
| DE | 197 38 803 A1 | 3/1999 |

* cited by examiner

*Primary Examiner*—Edward Lefkowitz
*Assistant Examiner*—Freddie Kirkland, III
(74) *Attorney, Agent, or Firm*—David Bujold & Daniels, P.L.L.C.

(57) ABSTRACT

A sensor arrangement (1) for a tachometric sensor of an automatic transmission (4) of a motor vehicle, which encompasses a module carrier (2) in which a part of a sensor housing (3) is integrated. The sensor housing (3) is secured in the module carrier (2) or in the transmission housing (4) by way of a guide in the plane and is so affixed as to prevent turning and an apparatus (5) for the generation of a prestress force by way of which the sensor housing (3) is pressed in the direction of the signal disk by way of a projection (8, 8') acting against the sensor housing (3).

14 Claims, 5 Drawing Sheets

SENSOR ARRANGEMENT FOR A TACHOMETER ON AN AUTOMATIC TRANSMISSION OF A MOTOR VEHICLE

This application claims priority from German Application Serial No. 10 2005 021 717.6 filed May 11, 2005.

FIELD OF THE INVENTION

The present invention concerns a sensor arrangement for a tachometer of an automatic transmission of a motor vehicle.

BACKGROUND OF THE INVENTION

DE 197 38 803 A1 discloses a sensor housing, which possesses two fastening flanges, each of which exhibits a penetrative opening, located at a right angle to the installed surface of a sensor to allow the through passage of a threaded bolt, whereby each penetration lies inside a bushing for which the fastening flange is bored. In this arrangement, the penetrations are designed as a slot and the bushings are made to conform to the circumference of the penetration. These surround the penetrations at a radial, separating distance. Further, the bushings are against the underside of the fastening flange on the inside circumferential side for a portion of their axial length free from the material of the housing. By way of this construction, what is achieved, is that the sensor can also be affixed on the construction surface, if the separating distance between the fastening means is subjected to large deviations.

Normally, according to the state of technology, various sensor lengths are realized in the module technology with the aid of different long sensor housings. In a disadvantageous manner, this requires several module variations which, in turn, require special measures in transmission assembly for the handling of the design variations.

In order to reduce the costs associated with manufacturing and mounting, the proposal is to reduce the size of the sensor housing and to incorporate sensor housings of different lengths into uniform carrier plates. Then these become "modules" and to slide these into their positions. In spite of the simplification, which could be achieved in this way, the disadvantage working with variant embodiments remains.

Designs have been made known, wherein spacer plates of various thicknesses are used in order to adjust the separating distance between the tachometer and the sending disk. In this way, the manipulation was simplified, although additional costs for the fabrication and the mounting of the spacers arose.

On this account, the present invention has the purpose of making a sensor arrangement available for a tachometer in an automatic transmission, which enables the installation of sensors of varying length. By way of the invented arrangement, the intention is that module variations of the presentation of different sensor lengths, as well as the connected extra labor are avoided or reduced.

SUMMARY OF THE INVENTION

According to the above, a sensor arrangement is given consideration, which encompasses a carrier in which a part of the sensor housing is incorporated, wherein the sensor housing is fixed in the module carrier or in the transmission housing by a guide in one plane and is installed to avoid any rotation.

The guide for this service is so designed to enable a movement of the sensor housing along the axis thereof. Further, an apparatus is present, for example a spring element, which produced an inherent force by means of which, the sensor housing becomes pushed in the direction of the transmitter disk within the guide, i.e., within the module carrier against a detent. In an advantageous manner, it is possible that the detent within the module can be so designed, that the height of the sensor experiences a necessary variant.

According to the invention, with regard to the necessary lengths of the sensor, further variations are realized in that the sensor housing is pushed toward a detent in the transmission housing, whereby the detent of the internal module has no function in this case.

Within the framework of an advantageous development, provision has been made that, in a case of identical transmission housings, the appropriate dimensions of the provided respective detent for a plurality of sensor lengths in the housings can be determined by way of an additional construction element, which fulfills the same function as a detent. For example, as an additional construction component, a bushing (or a spacer or shell) can be employed, whereby the bushing, in case it is assigned to the transmission housing, snaps closed, is pushed in or is screwed in. For an alternate case, wherein the bushing is assigned to a sensor, it can be impinged on the sensor, i.e., shoved on to the sensor housing.

In accord with an advantageous development of the invention, a surface would be provided or a machining of the transmission housing could be carried out to attain different diameter measurements which, with different sections on the sensor housing, could form a detent for the realization of a detent meeting the demands of different sensor lengths within the transmission housing.

According to the invention, provision is made to the effect that the electrical contacting of the sensor is to be done as a flexible electrical cable or a non-wired communication medium, so that a relative movement between the sensor housing and the module carrier is enabled. Advantageously, it possible within this purpose to install a stamped grid, a flexible conductive plate, a conducting foil or a cable bundle or non-wired transponder or a radio apparatus can be employed.

The spring element, which is provided in the module carrier, can advantageously be placed beside the location of the sensor, thus to achieve tension relief of the electrical contacting, for example, by the pushing of the flexible conductive plate, i.e., conducting foil onto the sensor housing.

By way of the invented conception, it is possible that different sensor lengths for tachometric devices integrated in electronic modules can be so installed that in an advantageous manner, different transmitting disks of various diameters can be employed without the known disadvantage of the state of the technology that more module variants for the presentation of different sensor lengths are necessary.

BRIEF DESCRIPTION OF THE DRAWINGS

The invention will now be described, by way of example, with reference to the accompanying drawings in which.

DETAILED DESCRIPTION OF THE INVENTION

Figure 1:
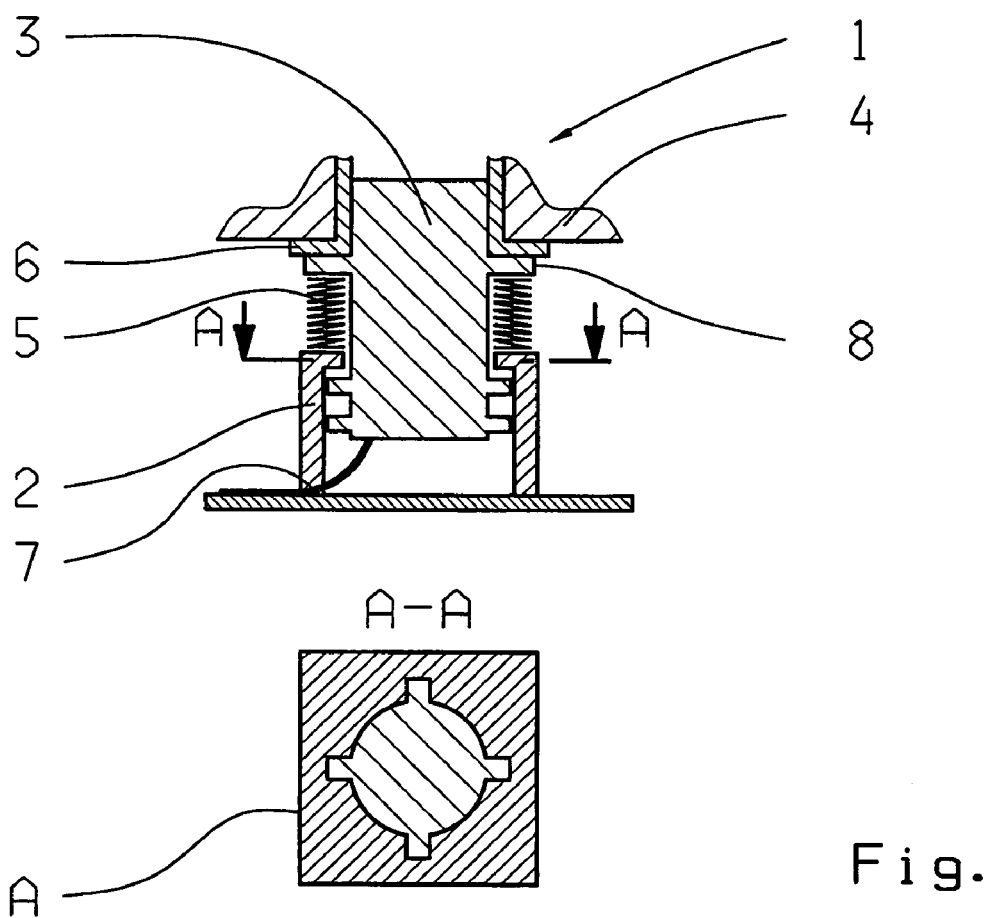
FIG. 1 is a schematic sectional view of a first embodiment example of a sensor arrangement according to the present invention, wherein the guide of the sensor housing in the housing of the transmission has been provided.

According to the invention and giving consideration to FIGS. 1 to 10, an invented sensor arrangement 1 encompasses a module carrier 2 in which a part of a sensor housing 3 is found, whereby the sensor housing 3 is secured in the module carrier 2 or in a transmission housing 4 by a guide fixed in the plane and is restrained against rotation. Further, the invented sensor arrangement 1 includes a spring apparatus 5 for the generation of a prestressed force by means of which the sensor housing 3 is pushed in the direction of the signal sending disk (not shown and hereinafter, "signal disk") by way of a projection 8 formed on the sensor housing 3 against a detent 6. In this way, it is possible for the detent 6 to be provided in the module carrier 2 or on the transmission housing 4.

The communication of electricity to the sensor is designed as a flexible electrical contact means 7 or possibly a no-wire contact means 7, so that a relative motion between the sensor housing 3 and the module carrier 2 is enabled.

In FIG. 1, a sensor arrangement is shown, wherein the guide of the sensor housing 3 is provided in the transmission housing 4, whereby, between that side of the module carrier 2, which is proximal to the transmission housing 4, and the projection 8, the spring element 5 is located, which presses the sensor housing 3 against the detent 6, which detent 6 is formed or placed on the transmission housing 4. In this assembly, a friction fit of the sensor housing 3 in the module carrier 2 is necessary. Advantageously, the sensor housing 3 is pressed into the modular carrier 2 and holdingly twisted into friction union, as can be seen in the partial FIG. 1A, which indicates a section along the line 1A-1A.

Figure 2:
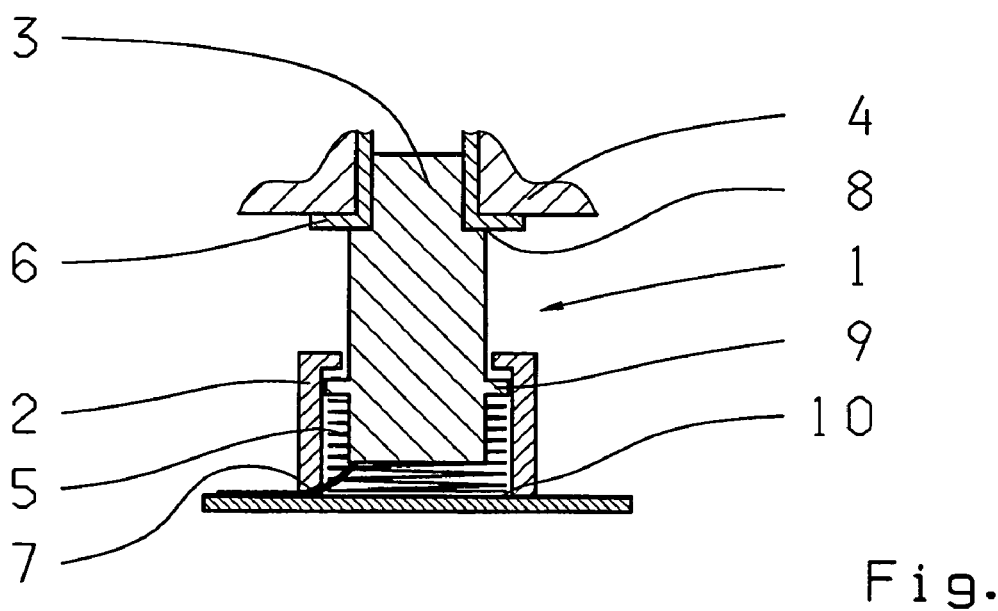
FIG. 2 is a schematic sectional view of a second embodiment example of a sensor arrangement according to the present invention, wherein the guide of the sensor housing is provided in the transmission housing.

The spring element 5, according to another embodiment of the invention, can be provided within the module carrier 2, whereby it would be located between an inner wall 10 and a projection 9 of the sensor housing 3. This is made plain in FIG. 2. As can be seen in FIG. 2, the sensor housing 3 is pressed against detent 6. The detent is formed on the transmission housing 4 of the transmission.

Figure 3:
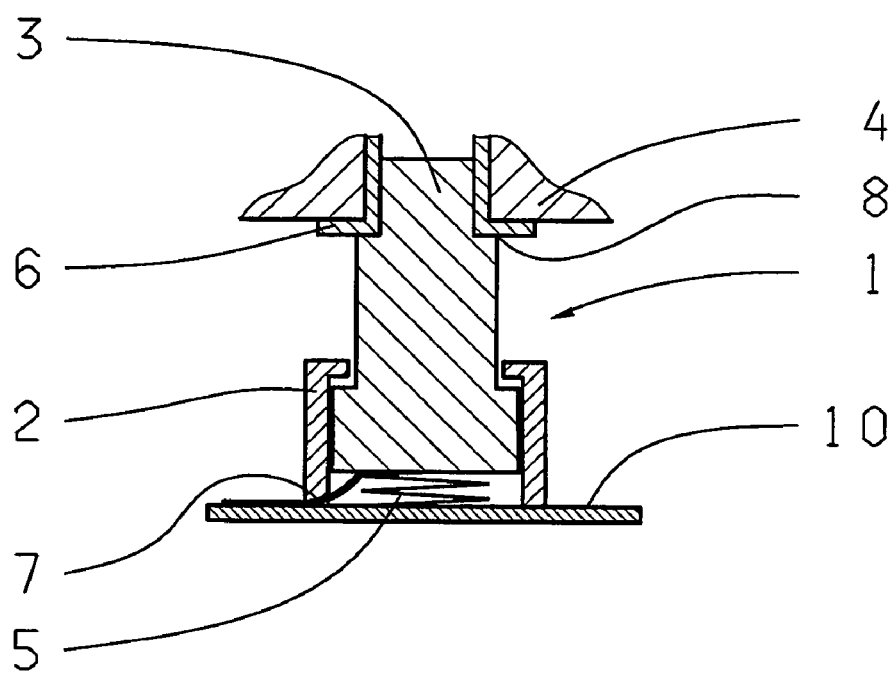
FIG. 3 is a schematic sectional view of a third embodiment example of a sensor arrangement according to the present invention, wherein the guide of the sensor housing is provided in the transmission housing.

In FIG. 3 is presented another advantageous arrangement of the spring element 5, this time within the invented sensor arrangement 1, whereby the guide of the sensor housing 3 is provided in the transmission housing 4. In this case, the spring element 5 is located within the module carrier 2, between the inner wall 10 and that side of the sensor housing 3 which is remote from the transmission housing 4.

Figure 4:
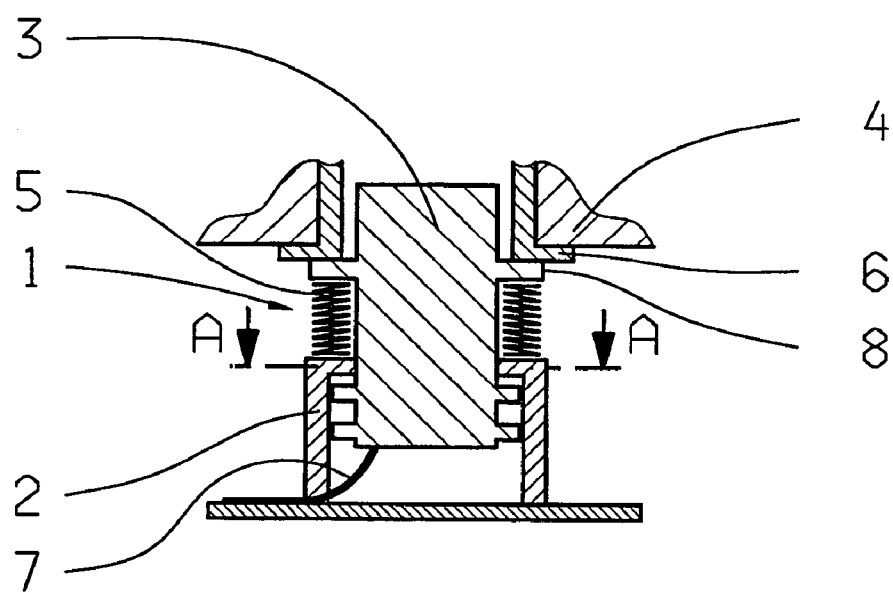
FIG. 4 is a schematic sectional view of a fourth embodiment example of a sensor arrangement according to the present invention, wherein the guide of the sensor housing is provided in the module carrier.
Figure 4:
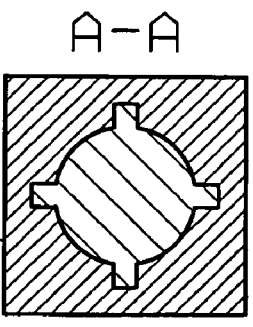
Figure 5:
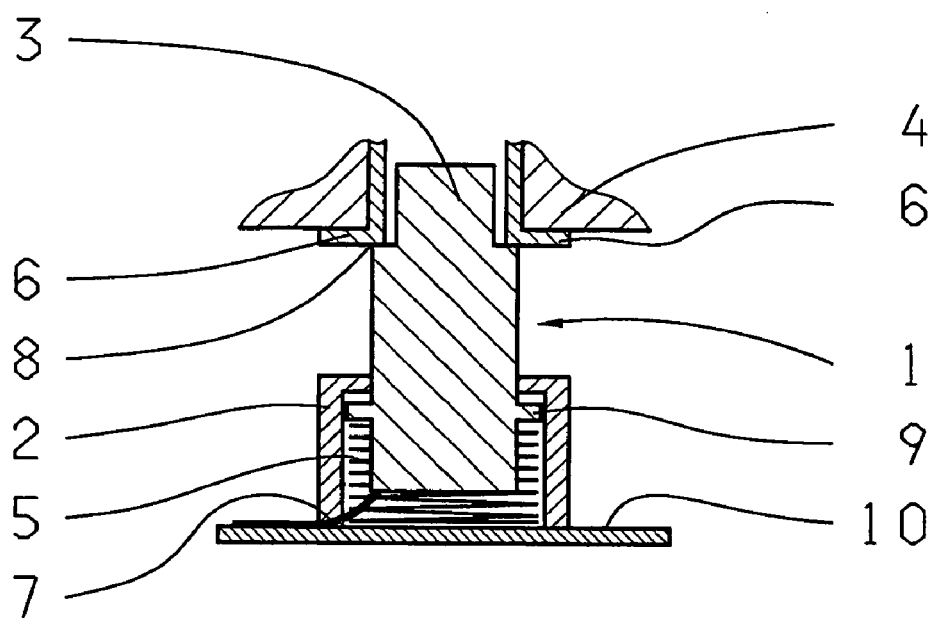
FIG. 5 is a schematic sectional view of a fifth embodiment example of a sensor arrangement according to the present invention, wherein the guide of the sensor housing is provided in the module carrier.
Figure 6:
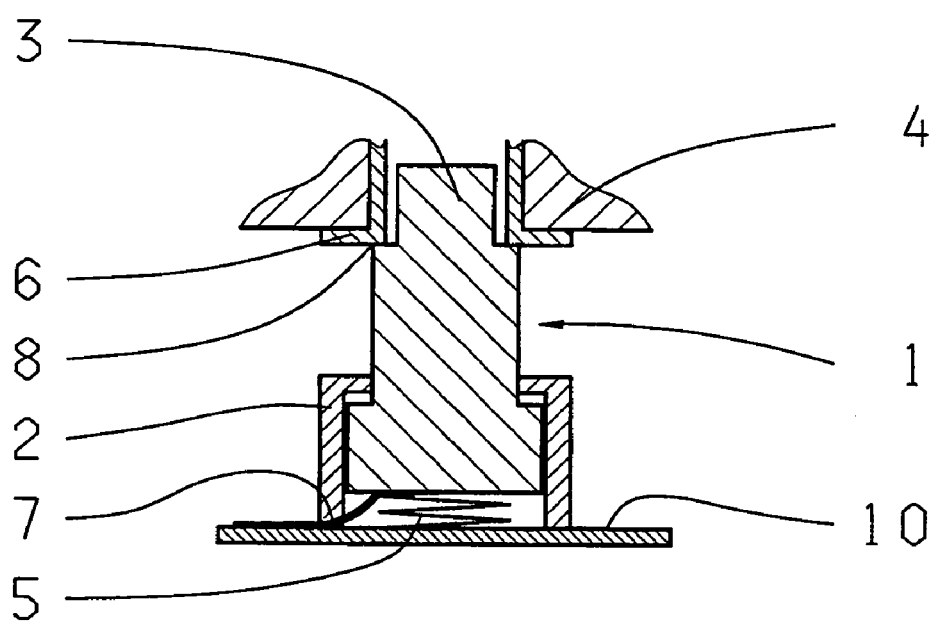
FIG. 6 is a schematic sectional view of a sixth embodiment example of a sensor arrangement according to the present invention, wherein the guide of the sensor housing is provided in the module carrier.

The sensor arrangements, as depicted in FIGS. 4, 5 and 6, correspond to the arrangements as shown in FIGS. 1, 2 and/or 3, with the difference being that the guide of the sensor housing 3 is provided in the module carrier 2.

In FIG. 4, a sensor arrangement 1 is shown wherein, between that side of the module carrier 2 which side is proximal to the transmission housing 4 and the projection 8 on the sensor housing 3, a spring element 5 is to be found, which presses the sensor housing 3 against the detent 6 provided on the transmission housing 4. Analogously seen, when compared to FIG. 1, also here a friction of the sensor housing 3 is necessary inside the module carrier 2. In this case, the sensor housing 3 is pushed into the module carrier 2 and rotated in the friction zone, as can be seen in the partial FIG. 4A, which indicates a section along the line 4A-4A.

In the case of the arrangement according to FIG. 5, the spring element 5 is provided within the module carrier 2 and is located between the inner wall 10 and the extension 9 of the sensor housing 3. According to FIG. 6, it is possible that the spring element 5 can be inserted within the module carrier 2 between the inner wall 10 and the side of the sensor housing 3, which is remote from the transmission housing 4.

Considering the arrangements illustrated in FIGS. 1 to 6, the detent 6 is formed on the transmission housing 4 by way of an additional, constructional component which fulfills that arresting function. Advantageously, to meet this demand, a sleeve is employed which, for installation, can be snapped in, force fit in place or screwed into position.

Figure 7:
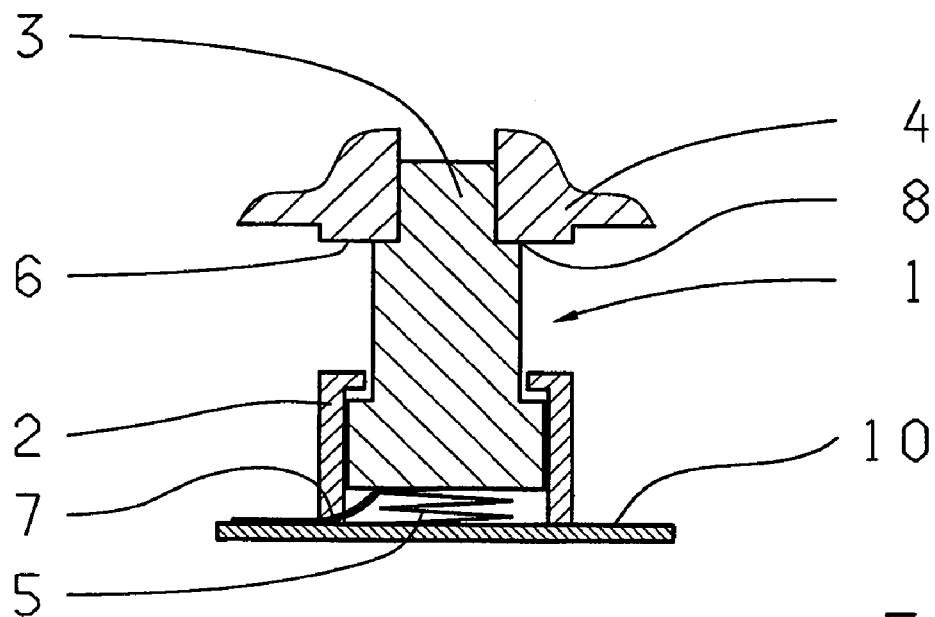
FIG. 7 is a schematic sectional view of another embodiment example of a sensor arrangement according to the present invention, wherein that side of the transmission housing proximal to the module carrier has been machined for the realization of a detent.

FIG. 7 brings forth a further embodiment of an invented sensor arrangement, wherein no additional component (as above) is employed on the transmission housing 4. The detent 6 is again formed by corresponding machining of that side of the transmission housing 4 which is proximal to the sensor housing 3. In FIG. 7, for example, the arrangement of the spring element 5 is within the module carrier 2, between the inner wall 10 and that side of the sensor housing 3, which is remote from the transmission housing 4. However, the spring element 5 can equally well be located as shown in FIGS. 1 and/or 2.

Figure 8:
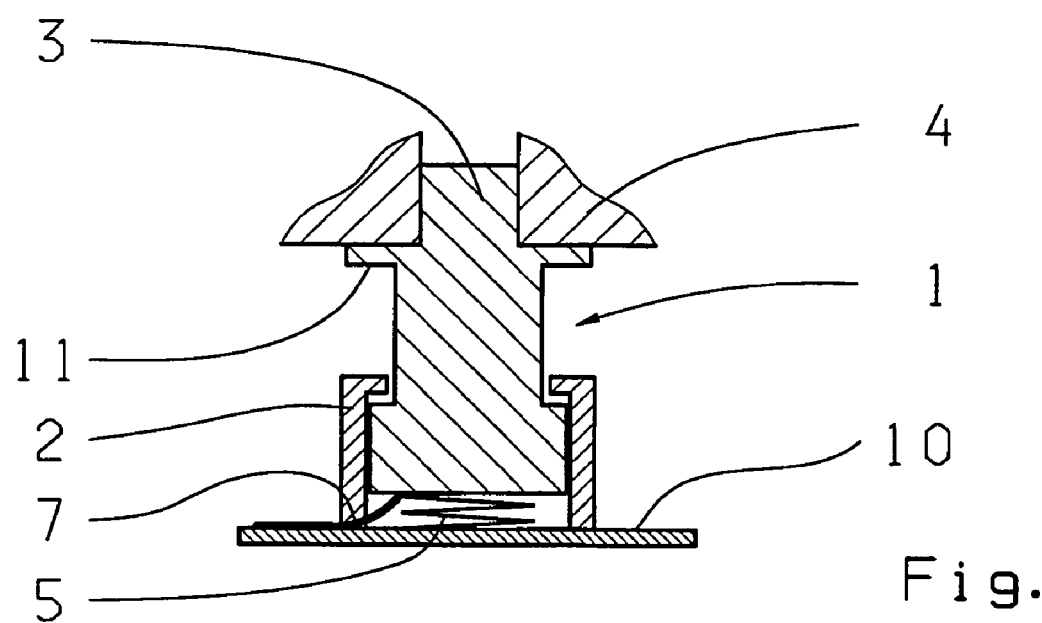
FIG. 8 is a schematic sectional view of yet another embodiment example of a sensor arrangement according to the present invention wherein, for the realization of a detent on the sensor housing, a shell has been imposed.
Figure 9:
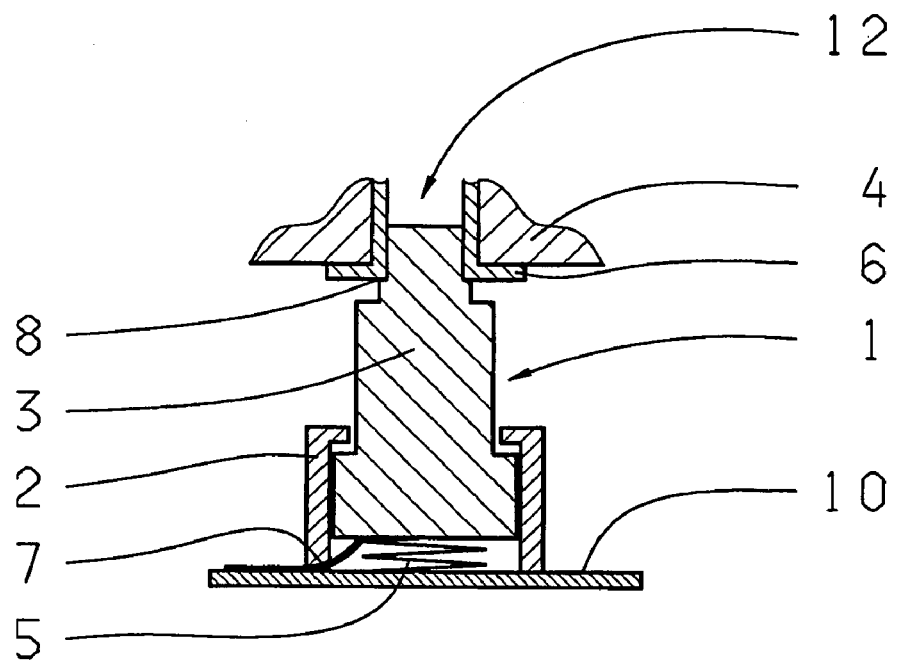
FIG. 9 is a schematic sectional view of another embodiment example of a sensor arrangement according to the present invention, wherein the boring of the transmission housing is so dimensioned that it form a detent in company with a projection provided on the sensor housing.
Figure 10:
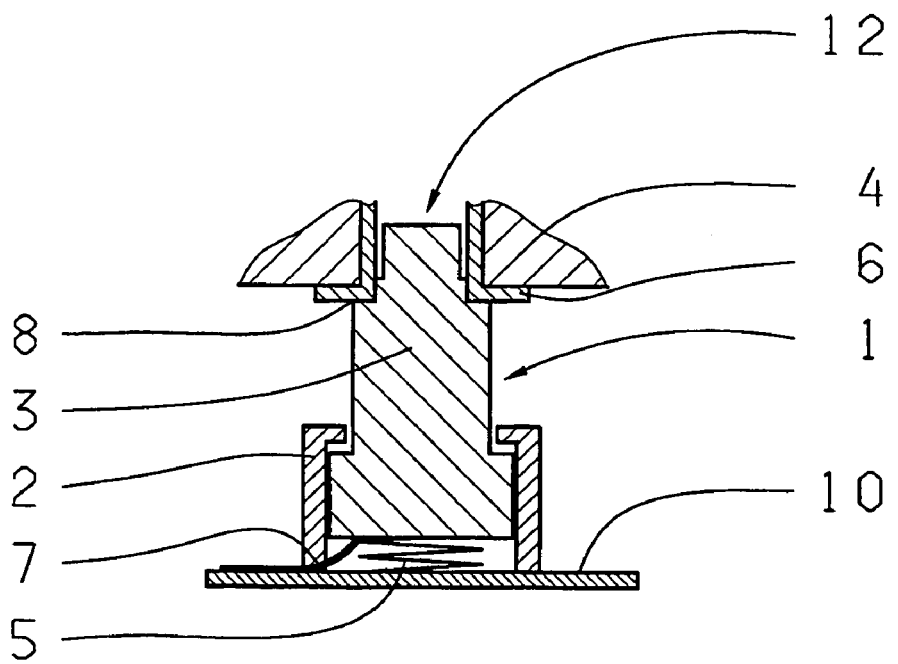
FIG. 10 is a schematic sectional view of another embodiment example of a sensor arrangement according to the present invention, wherein the boring of the transmission housing is so dimensioned that it forms a detent in company with a projection on the sensor housing.

Yet another object of FIG. 8 of the present invention is as follows: it is possible for the formation of the detent 6 on the sensor housing 3, to slidingly insert a shell 11, which is subjected to pressure by the spring-force of the spring element 5 against the transmission housing 4. In FIG. 8 is demonstrated the arrangement of the spring element 5 within the module carrier 2, between the inner wall 10 and that side of the sensor housing 3, which is remote from the transmission housing 4. In such an arrangement, it is also possible that further arrangements of the spring element 5, such as those shown in FIGS. 1 and 2, are possible.

Within the framework of the invention, it is possible that a provision can be made that, with consideration of the required sensor length, the transmission housing or the boring therein can be made with various dimensions, which form detents, again with different projections on the sensor housing. In this arrangement, it is possible to realize the different diameters even by way of the dimensioning of the additional constructive components for the formation of the detent 6 on the transmission housing 4, for example by the use of a sleeve. This is made evident in FIGS. 9 and 10.

The dimensioning of the sensor housing 3 is identical in both Figures. A different length of the sensor would be realized in that a boring 12 in the transmission housing 4 is respectively dimensioned, so that the transmission housing 4, respectively is so dimensioned to allow that the transmission housing with respectively another projection 8 or 8' forms the required detent on the sensor housing 3. In this arrangement, it is possible that the projection 8 or 8', because of the geometry of the sensor housing 3 or because of a slipped on shell, is defined. It is further possible that, besides the illustrated arrangement of the spring element 5, further arrangements of the spring element 5 can be provided which, for example, those in the framework of FIGS. 1 and 2 indicate.

By way of a corresponding formation and dimensioning of the detent 6, different sensor lengths may be accommodated without the necessity of a high-cost, multi-variant inventory for the sensors to be inserted.

Obviously, each constructive design, especially a spatial positioning of the components of the invented sensor arrangement, has inter-relations which are advantageously sound and fall under the protection of the present claims, without the function of the sensor arrangement, as this is given in the claims, even when these embodiments are not explicitly covered in the Figures or in the description.

REFERENCE NUMERALS 1 sensor arrangement
2 module carrier
3 sensor housing
4 transmission housing
5 spring element
6 detent
7 contacting means
8 projection
8' projection
9 projection
10 inner wall
11 shell
12 boring in transmission housing

The invention claimed is:

1. A sensor arrangement for a tachometric sensor of an automatic transmission of a motor vehicle, the sensor arrangement comprising:
   a sensor housing (3) containing a tachometric sensor, and a module carrier (2),
      a first portion of the sensor housing (3) being located in and axially moveable in a sensor housing opening in a transmission housing (4), and
      a second portion of the sensor housing (3) being located in and axially moveable in the module carrier (2),
      the sensor housing (3) being non-rotationally fixed in at least one of the module carrier (2) and the sensor housing opening in the transmission housing (4) by a guide,
   a first detent (6) surface located at and circumferential to the sensor housing opening in the transmission housing (4) and facing toward and coaxial with the module carrier (2),
   the sensor housing (3) having a second detent surface (8) circumferential to the sensor housing (3) and facing toward and coaxial with the sensor housing opening in the transmission housing (4),
   a resilient apparatus (5) acting between the sensor housing (3) and the module carrier (2) to generate a resilient prestress force by which the sensor housing (3) is resiliently and axially biased toward the transmission housing (4) so that the second detent surface on the sensor housing (3) bears against the first detent (6) surface, on the transmission housing (4), whereby
   the sensor housing (3) is axially positioned in the sensor housing opening at a predetermined axial position that is determined by the locations of the first and second detent surfaces (6, 8).

2. The sensor arrangement according to claim 1, wherein the detent (6) is provided in one of the module carrier (2) and in the transmission housing (4).

3. The sensor arrangement according to claim 1, wherein the detent (6) is provided on the transmission housing (4) and the detent (6) is formed by an additional element which functions as the detent (6).

4. The sensor arrangement according to claim 3, wherein the additional element, which functions as the detent (6) on the transmission housing (4), is a sleeve which is one of snapped on, force-fit installed, and screwed into place.

5. The sensor arrangement according to claim 1, wherein the detent (6) is provided on the transmission housing (4), and the detent (6) is formed by machining a side of the transmission housing (4) which is proximal to the sensor housing (3).

6. The sensor arrangement according to claim 1, wherein the detent (6) is provided on the transmission housing (4), a shell slidingly encapsulates the sensor housing (3) which is subjected to a pushing force, by the apparatus (5), for generation of the prestress force against the transmission housing (4).

7. The sensor arrangement according to claim 1, wherein a boring (12) which penetrates the transmission housing (4) has different depths, to accommodate a required length of the sensor, which form the detent (8, 8') by varied projections on the sensor housing (3).

8. The sensor arrangement according to claim 1, wherein the apparatus (5) for the generating of the prestressed force is a spring element (5).

9. The sensor arrangement according to claim 8, wherein the spring element (5) is placed between, a side of the module carrier (2) proximal to the transmission housing (4) and the projection (8) on the sensor housing (3) whereby a friction fit of the sensor housing (3) in the module carrier (2) is provided.

10. The sensor arrangement according to claim 8, wherein the spring element (5) is placed within the module carrier (2) between an inner wall (10) and an abutment (9) of the sensor housing (3).

11. The sensor arrangement according to claim 8, wherein the spring element (5) is placed within the module carrier (2) between an inner wall (10) and a side of the sensor housing (3) remote from the transmission housing (4).

12. The sensor arrangement according to claim 1, wherein an electrical contact (7) of the sensor is one of a flexible electrical and a non-wired connection such that relative movement between the sensor housing (3) and the module carrier (2) is facilitated.

13. The sensor arrangement according to claim 12, wherein the electrical contact (7) is one of a stamped grid, a flexible conducting plate, a conducting foil, a cable bundle and a non-wired transponder.

14. The sensor arrangement according to claim 1, wherein different sensor-lengths, by corresponding formation and sensor (6) dimensions, determine a use of the sensor.

* * * * *